US006616092B1

(12) United States Patent
Barnes et al.

(10) Patent No.: US 6,616,092 B1
(45) Date of Patent: Sep. 9, 2003

(54) REUSABLE FLYBACK ROCKET BOOSTER AND METHOD FOR RECOVERING SAME

(75) Inventors: Kenneth H. Barnes, Fort Worth, TX (US); William M. Butler, Highlands Ranch, CO (US); Paul E. Hagseth, Forth Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/178,428

(22) Filed: Jun. 24, 2002

(51) Int. Cl.[7] .............................. B64C 37/02; B64G 1/00
(52) U.S. Cl. ........................ 244/2; 244/158 R; 244/172; 244/63; 244/160
(58) Field of Search ............................... 244/2, 158 R, 244/172, 63, 160

(56) References Cited

U.S. PATENT DOCUMENTS 3,700,193 A * 10/1972 Bradley ..................... 244/162
4,834,324 A * 5/1989 Criswell ..................... 244/160
6,450,452 B1 * 9/2002 Spencer et al. ......... 244/158 R
6,454,216 B1 * 9/2002 Kiselev et al. .............. 244/160

* cited by examiner

Primary Examiner—J. Woodrow Eldred
(74) Attorney, Agent, or Firm—Baker Botts L.L.P.

(57) ABSTRACT

According to one embodiment of the invention, a rocket booster for launching a payload into space includes a fuselage adapted to support one or more fuel tanks inside the fuselage and a booster engine coupled to an aft portion of the fuselage. The booster engine is operable to provide thrust during an ascent phase of operation of the rocket booster. The rocket booster further includes a nacelle coupled to a forward portion of the fuselage and a flyback engine disposed within and coupled to the nacelle. The flyback engine is operable to provide thrust during a flyback phase of operation of the rocket booster. The rocket booster also includes one or more control surfaces coupled to the fuselage that are operable to control a flight pattern of the rocket booster during the flyback phase of operation. The flyback engine of the rocket booster is located forward of an aerodynamic center of the rocket booster.

25 Claims, 4 Drawing Sheets

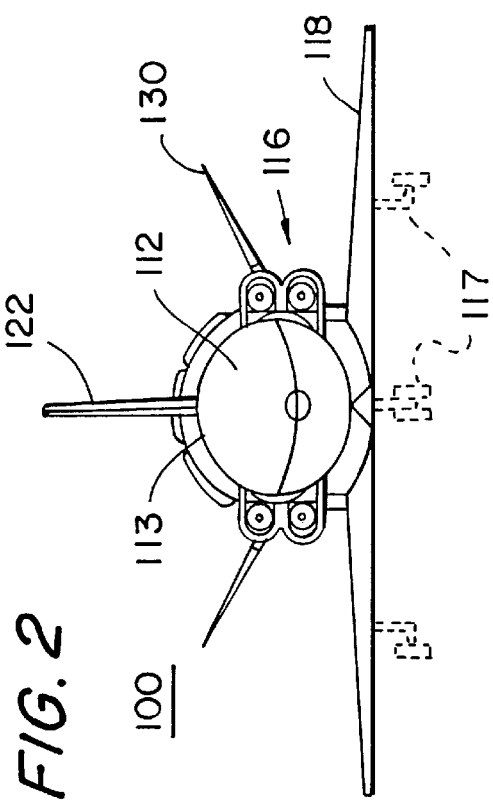
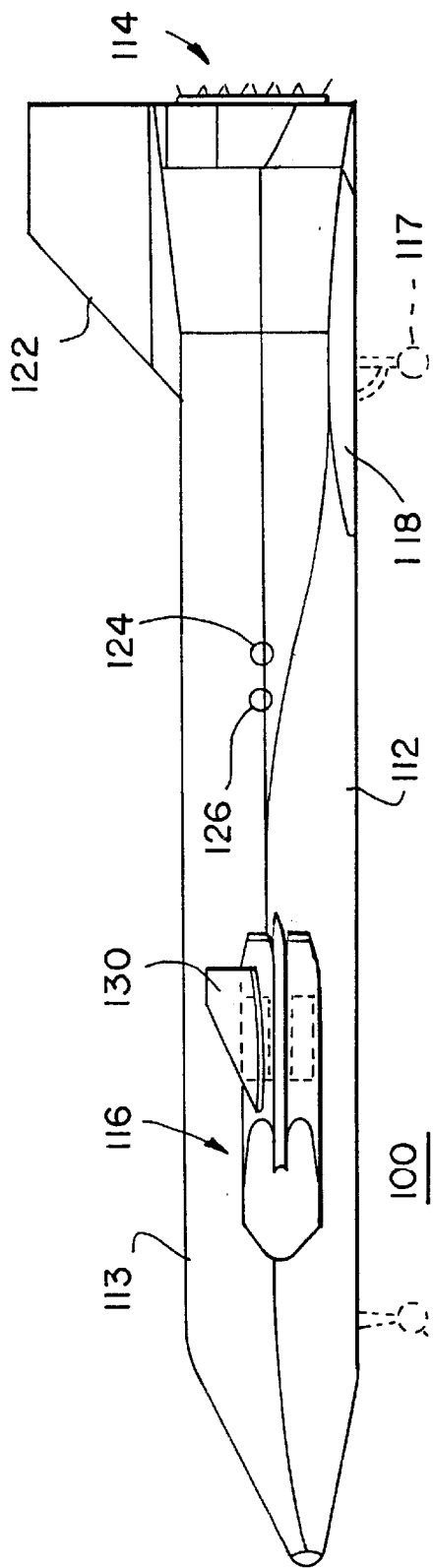

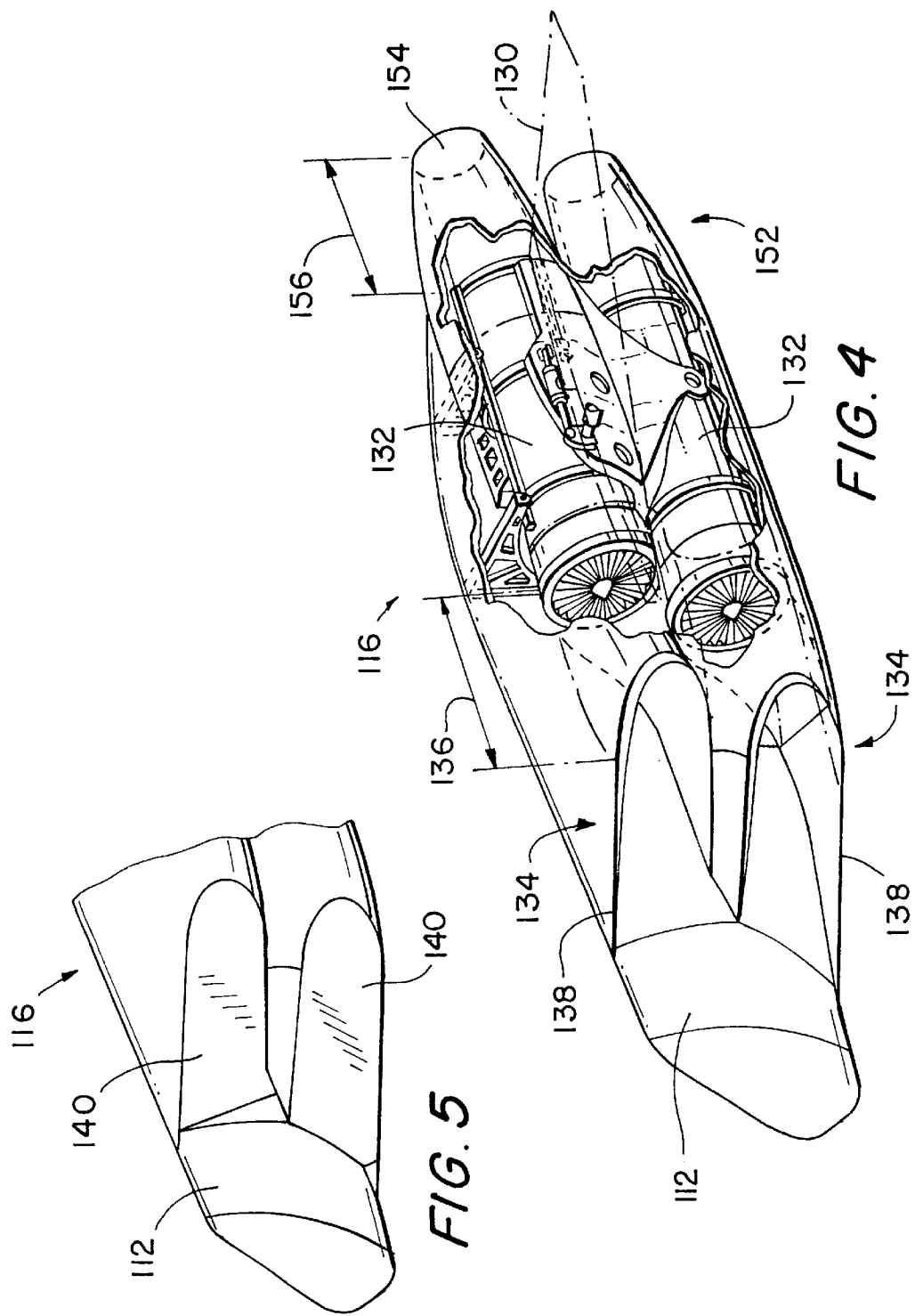

REUSABLE FLYBACK ROCKET BOOSTER AND METHOD FOR RECOVERING SAME

TECHNICAL FIELD OF THE INVENTION

The invention relates generally to rocket boosters and, more particularly, to a reusable flyback rocket booster and method for recovering a reusable flyback rocket booster.

BACKGROUND OF THE INVENTION

Rocket boosters are used for the booster stage when launching a payload, such as the space shuttle, into space. As such, rocket boosters must possess good aerodynamic characteristics that result in low levels of drag during the ascent phase of operation and to minimize any thermal, aerodynamic, and vibroacoustic loads during the ascent phase. Rocket booster typically includes a fuselage that houses one or more fuel tanks that provide the fuel for the propulsion during the booster stage. Once the fuel tanks are emptied and the rocket booster has completed its portion of the launch, the rocket booster is then separated from the other stages and the payload and returns to the Earth's surface.

To recover used rocket boosters, manufacturers of rocket boosters install one of more parachutes on the rocket booster so that the rocket booster falls to Earth at a speed that minimizes the damage to the rocket booster so that the rocket booster may be used in future launches. The rocket booster typically falls into a body of water, such as the ocean, and is retrieved via a ship. Even though parachutes are used to minimize the damage, there is still a lot of work to be done to the rocket booster to be able to use it in future applications. The recovery of the rocket booster, therefore, is very expensive and time-consuming.

SUMMARY OF THE INVENTION

According to one embodiment of the invention, a rocket booster for launching a payload into space includes a fuselage adapted to support one or more fuel tanks inside the fuselage and a booster engine coupled to an aft portion of the fuselage. The booster engine is operable to provide thrust during an ascent phase of operation of the rocket booster. The rocket booster further includes a nacelle coupled to a forward portion of the fuselage and a flyback engine disposed within and coupled to the nacelle. The flyback engine is operable to provide thrust during a flyback phase of operation of the rocket booster. The rocket booster also includes one or more control surfaces coupled to the fuselage that are operable to control a flight pattern of the rocket booster during the flyback phase of operation,. The flyback engine of the rocket booster is located forward of an aerodynamic center of the rocket booster.

Embodiments of the invention provide a number of technical advantages. Embodiments of the invention may include all, some, or none of these advantages. One technical advantage is that the cost of launching payloads into space is significantly reduced by providing a reusable rocket booster having a flyback engine. The flyback engine is mounted on a forward portion of the fuselage of the rocket booster to allow a center of gravity (c.g.) of the rocket booster during the flyback phase to be closely spaced with the aerodynamic center of the rocket booster. This allows desirable longitudinal stability and control characteristics of the rocket booster so that it may be recovered in a safe and reliable manner. Another technical advantage of one embodiment of the present invention is that the flyback engines are located in a nacelle that has an efficient aerodynamic design to reduce the propulsion system installation losses.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 2 is a front elevation view of the rocket booster of FIG. 1;

FIG. 3 is a side elevation view of the rocket booster of FIG. 1;

FIG. 4 is a perspective view, with a broken-out section, of a nacelle configuration of the rocket booster of FIG. 1 in accordance with one embodiment of the present invention;

FIG. 5 is a perspective view illustrating an inlet of the nacelle configuration in accordance with one embodiment of the present invention.

DETAILED DESCRIPTION OF THE INVENTION

Figure 1:
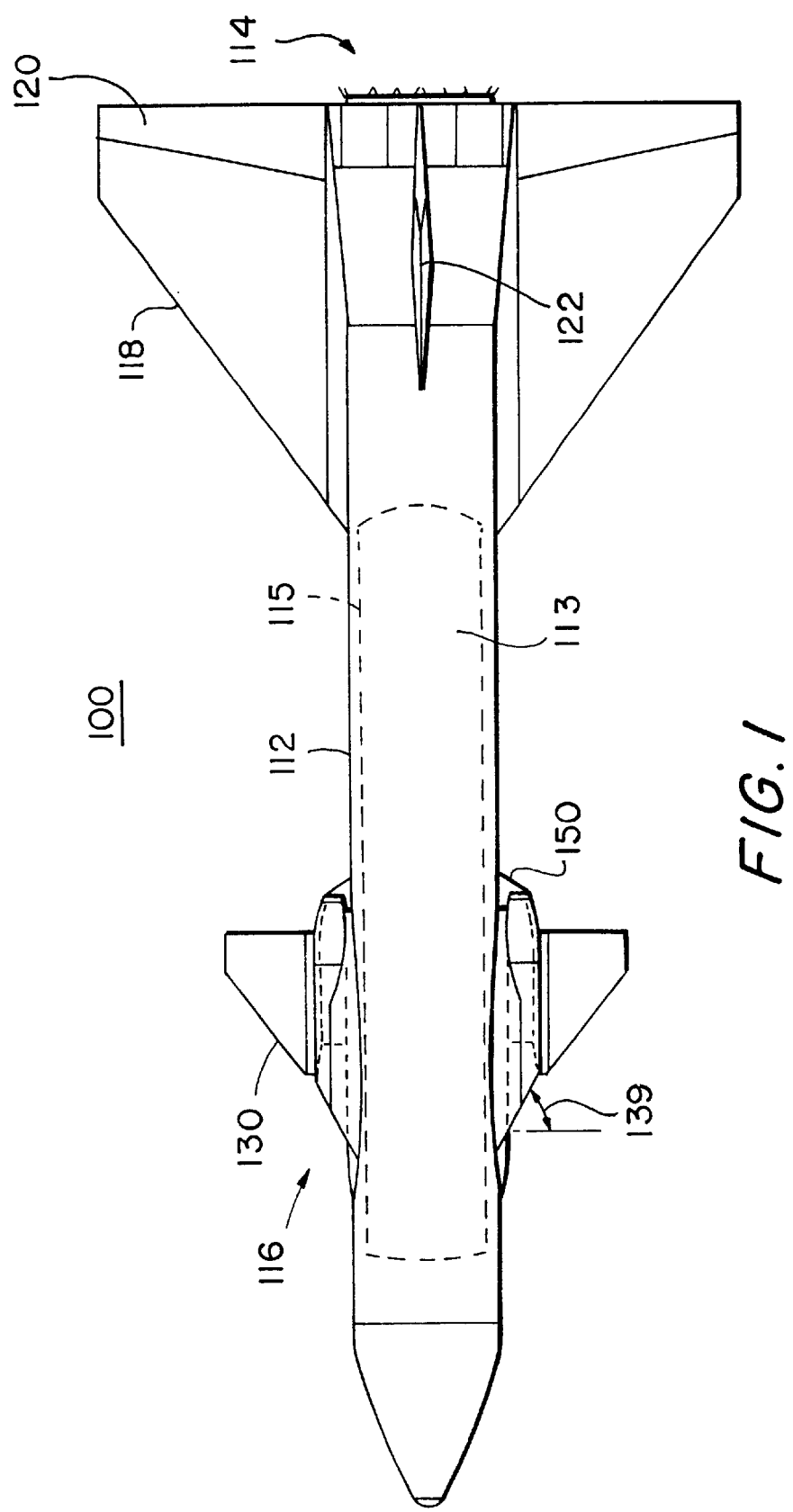
FIG. 1 is a top or planform view of a rocket booster in accordance with one embodiment of the present invention.

FIG. 1 is a top or planform view, FIG. 2 is a front elevation view, and FIG. 3 is a side elevation view of a rocket booster 100 in accordance with one embodiment of the present invention. As illustrated, rocket booster 100 includes a fuselage 112 having an upper surface 113 on which a payload (not explicitly shown) is mounted. The payload may be a space vehicle, a satellite, or any other suitable payload that is desired to be delivered to a place above the Earth's surface, such as space. Fuselage 112, which may be any suitable shape, is adapted to house one or more fuel tanks 115 that contain rocket fuel that supply one or more main rocket engines 114 during the liftoff and ascent stages of operation. Main rocket engines 114, also known as "booster engines," may be any suitable rocket engines and are coupled to an aft portion of fuselage 112 in any suitable manner.

According to the teachings of one embodiment of the present invention, rocket booster 100 is provided with one or more flyback engines 132 (FIG. 4) that are operable to provide thrust to rocket booster 100 during a generally horizontal flyback phase of operation so that rocket booster may land in a substantially horizontal position via landing gear 117. Landing gear 117 may be any suitable landing gear having any suitable number and type of components.

To facilitate the landing of rocket booster 100, rocket booster 100 includes one or more nacelles 116 coupled to a forward portion of fuselage 112 and one or more control surfaces coupled to fuselage 112. In the illustrated embodiment, the control surfaces include a pair of lifting surfaces 118, a pair of elevons 120, a rudder structure 122, a pair of canards 130, and a pair of closeout fairings 150. However, any suitable number and type of control surfaces may be used with rocket booster 100 to provide control to rocket booster 100 during the flyback phase of operation.

Nacelles 116 are described in greater detail below in conjunction with FIGS. 4 and 5. Generally, nacelles 116 house flyback engines 132 and are coupled to a forward portion of fuselage 112 so that a center of gravity ("c.g.") 126 of rocket booster 100 during the flyback phase of operation is closely spaced to an aerodynamic center ("a.c.") 124 of rocket booster 100 as shown in FIG. 3. To facilitate the spacial relationship of c.g. 126 and a.c. 124, nacelles 116 need to be coupled to a forward portion of fuselage 112 because most of the heavy components of rocket booster 100 during the flyback phase are located in an aft location of fuselage 112. For example, main booster rocket engines 114, lifting surfaces 118, elevons 120, and rudder 122 all have their component center of gravity in an aft location of fuselage 112. Having c.g. 126 and a.c. 124 in close proximity provides a controllable aerodynamic configuration for rocket booster 100 that facilitates the safe and reliable flying and landing of rocket booster 100 at a desired landing site. Nacelles 116 may be positioned on fuselage 112 such that c.g. 126 is just forward of a.c. 124, approximately equal to a.c. 124, or just aft of a.c. 124.

Lifting surfaces 118 are coupled to an aft portion of fuselage 112 in any suitable manner. In one embodiment, lifting surfaces 118 resemble a delta wing configuration; however, lifting surfaces 118 may take on other suitable configurations. Lifting surfaces 118 function to provide lift to rocket booster 100 during the flyback phase of operation. Each lifting surface 118 has an associated elevon 120 at a trailing edge thereof. Elevons 120 are coupled to lifting surfaces 118 in any suitable manner and take on any suitable configuration. Elevons 120 function to provide control, such as pitch and roll control, to rocket booster 100 during the flyback phase of operation.

Rudder 122 is coupled to an aft portion of fuselage 112 in any suitable manner. Rudder 122 may take on any suitable configuration and functions to provide lateral support to rocket booster 100 during the flyback phase of operation. Canards 130 are coupled to respective nacelles 116 in any suitable manner. Canards 130 may take on any suitable configuration and function to provide trim and horizontal control to rocket booster 100 during the flyback phase of operation.

FIG. 4 is a perspective view, with a broken-out section, of a pair of nacelles 116 on one side of rocket booster 100 in accordance with one embodiment of the present invention. Although two nacelles 116 are shown any number of nacelles 116 may be utilized with rocket booster 100 and they may be in any suitable location. Since rocket boosters typically have very high drag characteristics, each nacelle 116 preferably has a configuration that is suitable to provide an efficient aerodynamic design to reduce the propulsion system installation losses. In the illustrated embodiment, each nacelle 116 includes an inlet 134, flyback engine 132, and a nozzle 152.

Inlet 134 is generally simple in design and preferably includes a minimum of moving parts and actuation systems. Inlet 134 has a duct length 136 that is moderately short and straight and provides for low distortion and high pressure recovery. Inlet 134 includes an inlet aperture 138 that preferably is angled rearward as denoted by an angle 139 in FIG. 1. This facilitates high lip suction to reduce inlet drag. As illustrated in FIG. 5, inlet aperture 138 is covered by an inlet door 140 that is operable to cover inlet aperture 138 during the ascent phase of operation and to uncover inlet aperture 138 during the flyback phase of operation. During the ascent and boost phases, inlet door 138 protects flyback engines 132 from high aerodynamic, thermal, vibroacoustic loads. During the flyback phase, inlet door 138 allows smooth airflow to flyback engines 132. In one embodiment, inlet door 140 is pivotably mounted with a hinge to allow inlet door 140 to move between the closed position and the open position; however, inlet door 140 may be mounted in other suitable manners. The above-described inlet 134 provides low levels of drag and high levels of pressure recovery for most flight and engine operating conditions.

Nozzle 152 is generally an efficient design and preferably has a minimum of moving parts. Nozzle 152 is preferably configured to provide low levels of drag and high exhaust flow efficiency. Accordingly, nozzle 152 includes a nozzle duct 154 having a substantially constant circular cross-section and a duct length 156 that is substantially straight to allow for maximum nozzle flow coefficient. The design of the nozzle 152 facilitates minimal aerodynamic and thermal interaction between the hot exhaust of flyback engine 132 and the structure and aerodynamic characteristics of fuselage 112.

With reference to FIG. 1, nacelle 116 incorporates closeout fairings 150 between nozzle 152 and fuselage 112. Closeout fairings 150 allow a smooth entrainment of "freestream" air to flow around nacelles 116 to the region behind nacelles 116. Closeout fairings 150, which may have any suitable configuration, minimizes nozzle drag and creates a layer of external airflow between flyback engine 132 exhaust and the surface of fuselage 112 to reduce adverse aerodynamic and thermo/structural interactions.

As illustrated in FIG. 4, flyback engine 132 is mounted inside nacelle 116 in any suitable manner. Flyback engine 132 provides efficient and appropriate levels of thrust at the desired flight conditions to fly rocket booster 100 to the desired landing site. The present invention allows use of any suitable engine, including conventional gas turbine engines. For example, a low-to-medium bypass gas turbine engine may be used in one embodiment. Typical engines of this type include the General Electric F118 and F110 and Pratt & Whitney F100 and F119. High bypass ratio engines may also be used; however, although they typically offer slightly better fuel efficiency, they are not preferred because high bypass ratio engines are typically heavier and have much higher cross-sectional area that results in lower aerodynamic efficiency and directional stability. The low-to-medium bypass engines offer the highest thrust per unit frontal area along with a simple efficient straight flyback propulsion flowpath.

Figure 6:
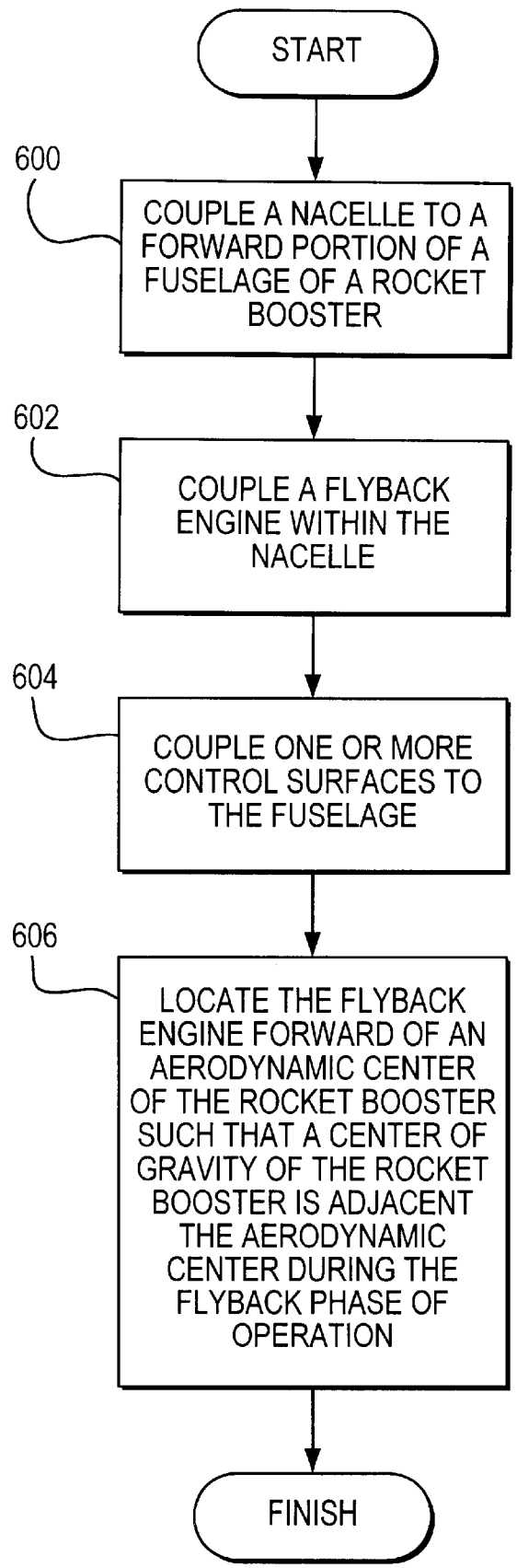
FIG. 6 is a flowchart illustrating a method of recovering a rocket booster used for launching a payload into space in accordance with one embodiment of the present invention.

FIG. 6 is a flowchart illustrating a method of recovering rocket booster 100 used for launching a payload into space in accordance with one embodiment of the present invention. The method begins at step 600 where nacelle 116 is coupled to a forward portion of a fuselage 112 of rocket booster 100. At step 602, flyback engine 132 is coupled within nacelle 116. As described above, flyback engine 132 is operable to provide thrust during a flyback phase of operation of rocket booster 100. At step 604, one or more control surfaces are coupled to fuselage 112. Any suitable number and type of control surfaces may be utilized; however, as described above, control surfaces may include lifting surfaces 118, elevons 120, rudder 122, canards 130, and closeout fairings 150. At step 606, flyback engine 132 is located forward of a.c. 124 of rocket booster 100 such that c.g. 126 of rocket booster 100 is adjacent a.c. 124 during the flyback phase of operation. As described above, c.g. 126 may be just forward of a.c. 124, approximately equal to a.c. 124, or just aft of a.c. 124. This ends one method of recovering rocket booster 100 used in launching a payload into space.

In operation of one embodiment of the invention, rocket booster 100 is utilized as a first stage in launching a payload into space. Accordingly, main rocket engines 114 of rocket booster 100 are used to provide thrust and propulsion during the first stage. The fuel used in main rocket engines 114 come from fuel tanks 115 housed within fuselage 112. After all fuel has been dispensed, rocket booster 100 then is separated from the rest of the stages and the payload and starts descending towards the Earth's surface. At an appropriate altitude, flyback engines 132 are activated and used to fly rocket booster 100 to a desired landing site in a safe and reliable manner. Flyback engines 132 and a flight pattern of rocket booster 100 may be controlled in any suitable manner. In addition, control surfaces used for rocket booster 100 may be any suitable control surfaces, such as those described above. Flyback engines 132 are housed in nacelles 116 that are coupled to a forward portion of fuselage 112. This facilitates c.g. 126 being adjacent a.c. 124 during the flyback phase of operation when fuel tanks are empty. Having c.g. 126 and a.c. 124 close to one another provides for a safe and controllable flight pattern for rocket booster 100 so that it may land safely at a desired landing site.

Although the present invention is described with various embodiments, a myriad of changes, variations, alterations, transformations, and modifications may be suggested to one skilled in the art. The present invention intends to encompass such changes, variations, alterations, transformations, and modifications as they fall within the scope of the appended claims.

What is claimed is:

1. A rocket booster for launching a payload into space, comprising:
   a fuselage adapted to support one or more fuel tanks inside the fuselage;
   a booster engine coupled to an aft portion of the fuselage, the booster engine operable to provide thrust during an ascent phase of operation of the rocket booster;
   a pair of nacelles coupled to a forward portion of the fuselage;
   a pair of flyback engines each disposed within and coupled to a respective nacelle, the flyback engines operable to provide thrust during a flyback phase of operation of the rocket booster;
   a pair of canards each coupled to a respective nacelle;
   one or more control surfaces coupled to the aft portion of fuselage, the control surfaces operable to control a flight pattern of the rocket booster during the flyback phase of operation; and
   wherein the flyback engines are located forward of an aerodynamic center of the rocket booster.

2. The rocket booster of claim 1, wherein the aerodynamic center of the rocket booster and a center of gravity of the rocket booster are closely spaced during the flyback phase of operation.

3. The rocket booster of claim 1, wherein the aerodynamic center of the rocket booster and a center of gravity of the rocket booster are approximately equal during the flyback phase of operation.

4. The rocket booster of claim 2, wherein the center of gravity is located forward of the aerodynamic center.

5. The rocket booster of claim 1, wherein each nacelle comprises an inlet and a nozzle, and wherein a closeout fairing is coupled between the nozzle and the fuselage.

6. The rocket booster of claim 5, wherein the nozzle has a substantially circular cross-section and a substantially straight configuration.

7. The rocket booster of claim 5, wherein the inlet includes a door operable to cover the inlet during the ascent phase of operation and to uncover the inlet during the flyback phase of operation.

8. The rocket booster of claim 5, wherein the inlet includes an inlet aperture angled rearward to provide high lip suction and reduce inlet drag during the ascent phase of operation.

9. The rocket booster of claim 1, wherein the one or more control surfaces comprise:
   a pair of lifting surfaces coupled to the aft portion of the fuselage, the lifting surfaces positioned adjacent the booster engine and resembling a delta wing configuration;
   a pair of elevons, each elevon coupled to a trailing edge of a respective lifting surface; and
   a rudder coupled to the aft portion of the fuselage adjacent the booster engine.

10. A rocket booster for launching a payload into space, comprising:
    a fuselage adapted to support one or more fuel tanks inside the fuselage;
    a booster engine coupled to an aft portion of the fuselage, the booster engine operable to provide thrust during an ascent phase of operation of the rocket booster;
    a nacelle coupled to a forward portion of the fuselage, the nacelle including an inlet and a nozzle, the nozzle having a substantially circular cross-section and a substantially straight configuration;
    a door coupled to the inlet, the door operable to cover the inlet during the ascent phase of operation;
    a flyback engine coupled to the nacelle and disposed between the inlet and the nozzle, the flyback engine operable to provide thrust during a flyback phase of operation of the rocket booster;
    a canard coupled to the nacelle;
    a pair of lifting surfaces coupled to the aft portion of the fuselage, the lifting surfaces positioned adjacent the booster engine;
    a pair of elevons, each elevon coupled to a trailing edge of a respective lifting surface;
    a rudder coupled to the aft portion of the fuselage adjacent the booster engine; and
    wherein the flyback engine is located forward of an aerodynamic center of the rocket booster such that the aerodynamic center of the rocket booster and a center of gravity of the rocket booster are closely spaced during the flyback phase of operation.

11. The rocket booster of claim 10, wherein the aerodynamic center of the rocket booster and a center of gravity of the rocket booster are approximately equal during the flyback phase of operation.

12. The rocket booster of claim 10, wherein the center of gravity is located forward of the aerodynamic center.

13. The rocket booster of claim 10, further comprising a closeout fairing coupled between the nozzle and the fuselage.

14. The rocket booster of claim 10, wherein the inlet further includes an inlet aperture angled rearward to provide high lip suction and reduce inlet drag during the ascent phase of operation.

15. A method of recovering a rocket booster used for launching a payload into space, comprising:
    coupling a nacelle to a forward portion of a fuselage of the rocket booster;

coupling a flyback engine within the nacelle, the flyback engine operable to provide thrust during a flyback phase of operation of the rocket booster;

coupling a canard to the nacelle;

coupling one or more control surfaces to an aft portion of the fuselage, the control surfaces operable to control a flight pattern of the rocket booster during the flyback phase of operation; and locating the flyback engine forward of an aerodynamic center of the rocket booster such that a center of gravity of the rocket booster is adjacent the aerodynamic center during the flyback phase of operation.

16. The method of claim 15, wherein locating the flyback engine forward of the aerodynamic center of the rocket booster comprises locating the flyback engine forward of an aerodynamic center of the rocket booster such that a center of gravity of the rocket booster is approximately equal to the aerodynamic center during the flyback phase of operation.

17. The method of claim 15, wherein locating the flyback engine forward of the aerodynamic center of the rocket booster comprises locating the flyback engine forward of an aerodynamic center of the rocket booster such that a center of gravity of the rocket booster is forward of the aerodynamic center during the flyback phase of operation.

18. The method of claim 15, further comprising coupling a closeout fairing between a nozzle of the nacelle and the fuselage.

19. The method of claim 15, further comprising covering an inlet of the nacelle during the ascent phase of operation and uncovering the inlet during the flyback phase of operation.

20. The method of claim 15, coupling one or more control surfaces to the fuselage comprises:

coupling a pair of lifting surfaces to the aft portion of the fuselage, the lifting surfaces positioned adjacent a booster engine of the rocket booster;

coupling an elevon to a trailing edge of each of the lifting surfaces; and coupling a rudder to the aft portion of the fuselage adjacent the booster engine.

21. A rocket booster for launching a payload into space, comprising:

a fuselage adapted to support one or more fuel tanks inside the fuselage;

a booster engine coupled to an aft portion of the fuselage, the booster engine operable to provide thrust during an ascent phase of operation of the rocket booster;

a nacelle coupled to a forward portion of the fuselage;

a flyback engine disposed within and coupled to the nacelle, the flyback engine operable to provide thrust during a flyback phase of operation of the rocket booster;

a canard coupled to the nacelle;

a pair of non-rotatable lifting surfaces coupled to the aft portion of the fuselage, the non-rotatable lifting surfaces positioned adjacent the booster engine and resembling a delta wing configuration;

a pair of elevons, each elevon coupled to a trailing edge of a respective non-rotatable lifting surface;

a rudder coupled to the aft portion of the fuselage adjacent the booster engine; and wherein the flyback engine is located forward of an aerodynamic center of the rocket booster.

22. The rocket booster of claim 21, wherein the aerodynamic center of the rocket booster and a center of gravity of the rocket booster are closely spaced during the flyback phase of operation.

23. The rocket booster of claim 21, wherein the aerodynamic center of the rocket booster and a center of gravity of the rocket booster are approximately equal during the flyback phase of operation.

24. The rocket booster of claim 21, wherein the nacelle comprises an inlet and a nozzle, and wherein a closeout fairing is coupled between the nozzle and the fuselage.

25. The rocket booster of claim 24, wherein the inlet includes a door operable to cover the inlet during the ascent phase of operation and to uncover the inlet during the flyback phase of operation.

* * * * *